United States Patent
Kim et al.

(10) Patent No.: US 9,365,219 B2
(45) Date of Patent: Jun. 14, 2016

(54) METHOD AND APPARATUS FOR CONTROLLING START OF VEHICLE

(71) Applicant: Hyundai Motor Company, Seoul (KR)

(72) Inventors: Jin Wook Kim, Gyeonggi-Do (KR); Yoon Jun Lee, Seoul (KR)

(73) Assignee: Hyundai Motor Company, Seoul (KR)

(*) Notice: Subject to any disclaimer, the term of this patent is extended or adjusted under 35 U.S.C. 154(b) by 0 days.

(21) Appl. No.: 14/562,738

(22) Filed: Dec. 7, 2014

(65) Prior Publication Data

US 2016/0059866 A1   Mar. 3, 2016

(51) Int. Cl.
*B60W 50/02* (2012.01)
*B60W 10/08* (2006.01)
*B60W 10/26* (2006.01)

(52) U.S. Cl.
CPC .............. *B60W 50/02* (2013.01); *B60W 10/08* (2013.01); *B60W 10/26* (2013.01)

(58) Field of Classification Search
CPC ............ B60W 50/02; B60W 50/0205; B60W 50/0215; B60W 50/0225; B60W 10/26; B60W 10/08
USPC ............................................. 701/22, 36, 29.2
See application file for complete search history.

(56) References Cited

U.S. PATENT DOCUMENTS

| | | | |
|---|---|---|---|
| 6,927,962 B2 * | 8/2005 | Tamura | G05B 9/02 307/10.1 |
| 8,073,577 B2 * | 12/2011 | Kitamura | B60R 16/0231 307/10.1 |
| 2014/0156126 A1 * | 6/2014 | Tran | B60G 17/0165 701/22 |
| 2015/0051771 A1 * | 2/2015 | Greenwood | B60L 3/04 701/22 |

FOREIGN PATENT DOCUMENTS

| | | |
|---|---|---|
| JP | 5305390 B2 | 10/2013 |
| KR | 20-0165689 Y1 | 1/2000 |
| KR | 10-2002-0039769 A | 5/2002 |
| KR | 10-2006-0032264 A | 4/2006 |
| KR | 10-2011-0035255 A | 4/2011 |
| KR | 101125304 B1 | 3/2012 |

* cited by examiner

*Primary Examiner* — Thomas Tarcza
*Assistant Examiner* — Tyler J Lee
(74) *Attorney, Agent, or Firm* — Mintz Levin Cohn Ferris Glovsky and Popeo, P.C.; Peter F. Corless

(57) ABSTRACT

A method and system for controlling the start of a vehicle are provided. The method includes determining whether a high voltage battery of a vehicle is submerged and outputting a warning regarding the submersion when the high voltage battery is submerged. In addition, power is cut off and the vehicle ignition or the start of the vehicle is turned off after the warning signal is output.

10 Claims, 2 Drawing Sheets

METHOD AND APPARATUS FOR CONTROLLING START OF VEHICLE

CROSS-REFERENCE(S) TO RELATED APPLICATION

The present application claims priority to Korean Patent Application No. 10-2014-0115664, filed Sep. 1, 2014, the entire contents of which is incorporated herein for all purposes by this reference.

BACKGROUND

1. Technical Field

The present invention relates to a technology for turning on or off the start of a vehicle based on whether a high voltage battery is submerged.

2. Description of the Related Art

In recent years, as carbon energy has been gradually depleted and interest in the environment has increased, demand for environmentally friendly vehicles such as a hybrid vehicle and an electric vehicle has increased. Further, the hybrid vehicle and the electric vehicle exhibit improved fuel efficiency and discharge minimal pollutant compared to a conventional vehicle using only an engine. In the hybrid vehicle and the electric vehicle mentioned above, since the most essential component may be a battery, more research has been developed on the battery for the hybrid vehicle and the electric vehicle.

However, in regards to the battery for a vehicle used in the hybrid vehicle or the electric vehicle, stability is being considered an important factor for efficiency since a battery for the vehicle may be exposed to the various environments. In particular, the vehicle may be partially or wholly submerged due to several causes such as heavy rain, a fall, or the like, whereby the battery pack for the vehicle may also be submerged. In particular, the battery pack for the vehicle may become damaged as well as passengers within the vehicle and may be electrocuted by infiltrated water. Since the battery pack for the vehicle in which a number of unit battery modules are connected in series generates high voltage to drive a motor, when leakage current is generated due to the submersion of the battery pack, passenger safety or safety of persons surrounding the vehicle may be at risk.

The related arts for overcoming the above mentioned problems have the object of protecting the battery by cutting off charge and discharge routes when the battery is submerged, and require separate devices to be installed for the object.

The description provided above as a related art of the present invention is merely for helping in understanding the background of the present invention and should not be construed as being included in the related art known by those skilled in the art.

SUMMARY

The present invention provides a vehicle or the driver thereof with safety by cutting off start and high voltage relays during the initial start of the vehicle or in response to sensing the submersion of the high voltage battery during the driving of the vehicle.

In one aspect, the present invention provides a method for controlling the start of a vehicle that may include: determining whether a high voltage battery of a vehicle is submerged; outputting a warning signal when the high voltage battery is submerged; and turning OFF the ignition or the start of the vehicle after outputting the warning signal.

The determination of the submersion may include determining whether the high voltage battery is submerged when the vehicle's ignition is turned ON. In addition, the method for controlling the start of a vehicle may further include turning start ON when the high voltage battery is not submerged. The submersion determination process may further include determining whether the high voltage battery is submerged when the start of the vehicle is turned ON.

The method for controlling the start of a vehicle may further include determining whether the vehicle is driving after outputting the submersion warning when the high voltage battery is submerged. As a result of determining the vehicle is driving, a driving power of the vehicle may be gradually decreased during a preset time, and when the driving power of the vehicle is removed, a power cut off process may be performed. As a result determining when the vehicle is stopped, the power cut off process may be performed. When the power cut off process is performed, the connection with the high voltage battery and the high voltage device may be cut off.

An apparatus for controlling the start of a vehicle may include a sensing system configured to sense whether a high voltage battery of the vehicle is submerged; a controller configured to output a warning signal and turn OFF the ignition of the vehicle or the start thereof when the high voltage battery is submerged; and a warning unit configured to receive the warning signal to provide a user with a submersion warning information.

When the vehicle is in an ignition ON condition or in a start ON condition, the sensing system may be configured to determine whether the high voltage battery is submerged. The apparatus for controlling the start of a vehicle may further include a high voltage relay disposed between the high voltage battery and the high voltage device and configured to connect or disconnect the high voltage battery and the high voltage device based on driving or non-driving of the high voltage relay. When the vehicle turns OFF the ignition or the start thereof, the controller may be configured to drive the high voltage relay.

BRIEF DESCRIPTION OF THE DRAWINGS

The above and other features of the present invention will now be described in detail with reference to exemplary embodiments thereof illustrating the accompanying drawings which are given herein below by way of illustration only, and thus are not limitative of the present invention, and wherein.

Figure 1:
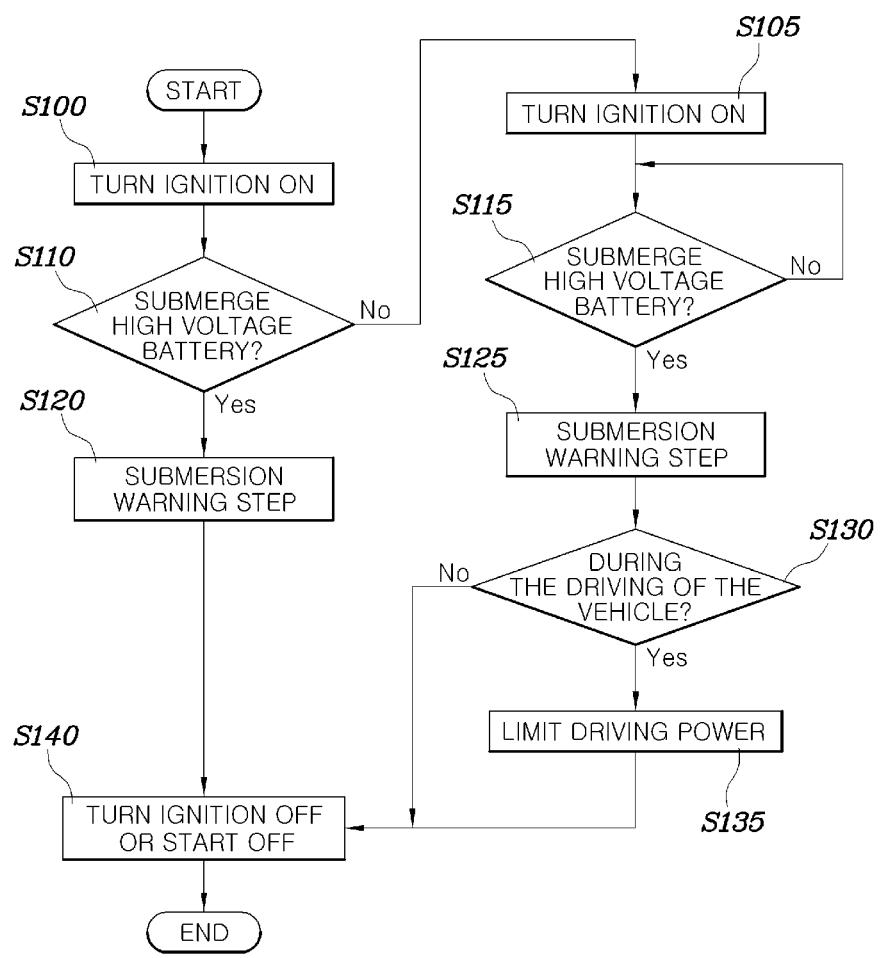
FIG. 1 is an exemplary flow chart illustrating a method for controlling the start of a vehicle according to an exemplary embodiment of the present invention.

It should be understood that the appended drawings are not necessarily to scale, presenting a somewhat simplified representation of various exemplary features illustrative of the basic principles of the invention. In the figures, reference numbers refer to the same or equivalent parts of the present invention throughout the several figures of the drawing.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

Although exemplary embodiment is described as using a plurality of units to perform the exemplary process, it is understood that the exemplary processes may also be performed by one or plurality of modules. Additionally, it is understood that the term controller/controlling unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/controlling unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Hereinafter, an exemplary embodiment of the present invention will be described in detail with reference to the accompanying drawings.

Hereinafter, reference will now be made in detail to various exemplary embodiments of the present invention, examples of which are illustrated in the accompanying drawings and described below. While the invention will be described in conjunction with exemplary embodiments, it will be understood that the present description is not intended to limit the invention to those exemplary embodiments. On the contrary, the invention is intended to cover the exemplary embodiments as well as various alternatives, modifications, equivalents and other exemplary embodiments; which may be included within the spirit and scope of the invention as defined by the appended claims.

Hereinafter, a method and an apparatus for controlling the start of a vehicle according to an exemplary embodiment of the present invention will be described with reference to the accompanying drawings. FIG. 1 is an exemplary flow chart illustrating a method for controlling the start of a vehicle according to an exemplary embodiment of the present invention. Further, FIG. 2 is an exemplary block diagram illustrating an apparatus for controlling the start of a vehicle according to an exemplary embodiment of the present invention.

Figure 2:
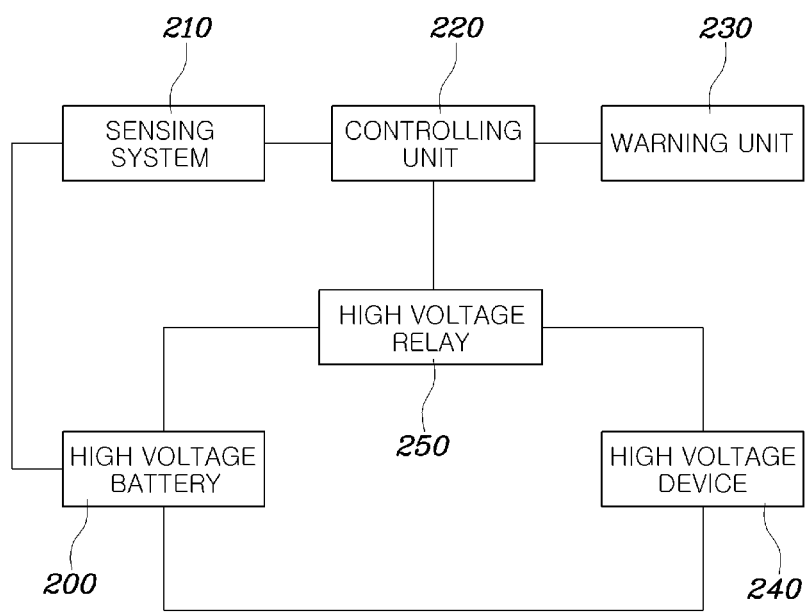
FIG. 2 is an exemplary block diagram illustrating an apparatus for controlling the start of a vehicle according to an exemplary embodiment of the present invention.

Referring to FIGS. 1 and 2, an apparatus for controlling the start of a vehicle may include: a sensing system 210 configured to sense whether a high voltage battery 200 of the vehicle is submerged; a controller 220 configured to output a warning signal and turn OFF the start of the vehicle when the high voltage battery 200 is submerged; and a warning unit 230 configured to receive the warning signal to provide a user with a submersion warning information. The controller 220 may be configured to operate the sensing system 210 and the warning unit 230.

The sensing system 210 may be configured to determine whether the high voltage battery 200 is submerged when the vehicle is in an ignition ON condition or a start ON condition. In other words, the sensing system 210 may be configured to sense whether the high voltage battery 200 is submerged using a sensor and then output a sensing value to the controller 220 based on the sensing result and the controller 220 may be configured to determine whether the high voltage battery 200 is submerged based on the sensing value input. Further, the sensing system 210 may be configured to sense whether the high voltage battery 200 is submerged by applying a submersion sensor to alter the height within or extraneous to the high voltage battery 200 or by applying a humidity sensor to compare sensed humidity with the preset critical humidity.

Further, the controller 220 may be a battery management system (BMS) typically applied to the vehicle, and thus a separate device may be omitted for configuring the present invention. Further, the warning unit 230 may include a display device, an audio device or the like to provide the user with the submersion warning information. In addition, an exemplary embodiment of the present invention may further include a high voltage relay 250 disposed between a high voltage battery 200 and a high voltage device 240 and configured to connect or disconnect the high voltage battery 200 and the high voltage device 240 based on driving or non-driving of the high voltage relay 250, wherein the controller 220 may be configured to operate the high voltage relay 250 when the ignition of a vehicle is turned OFF or the start thereof is turned OFF.

In particular, the high voltage device 240 which uses high voltage irrespective of a start mechanism may correspond to a motor, inverter or the like. When the high voltage battery 200 is submerged as described above, the controller 220 may be configured to disconnect the high voltage battery 200 and the high voltage device 240 while turning OFF the ignition or start, to avoid a dangerous situation such as failure or electric shock.

A method for controlling the start of a vehicle according to an exemplary embodiment of the present invention may include: determining, by a sensor, whether a high voltage battery 200 of the vehicle is submerged S110, S115; outputting, by a controller, a warning signal when the high voltage battery is submerged S120, S125; and cutting off power, by the controller, for turning OFF the ignition of the vehicle or the start thereof after output of the warning signal S140.

Firstly, the submersion determination S110, S115 may include a first submersion determination S110 for determining whether the high voltage battery 200 is submerged while a vehicle is in the ignition ON condition S100. For example, a start procedure of a vehicle generally goes through the ignition ON condition before turning ON by a key S100, wherein, controller 220 of the vehicle may be operated in the ignition ON condition S100. Accordingly, when the vehicle is in the ignition ON condition, whether the high voltage battery 200 is submerged may be determined S110 by the controller 220. When the high voltage battery 200 is submerged, the submersion warning S120 may be performed to allow a user to recognize the submersion situation and then power may be cut off S140.

As described above, a dangerous situation, which may be caused by turning ON the start of the vehicle when the high voltage battery 200 is submerged, may be prevented by determining whether the high voltage battery 200 is submerged in the ignition ON condition before the start of a vehicle is turned ON. Further, the controller 220 mounted within the vehicle may be used without adding a separate controller or power supply, and thus costs may be saved.

Furthermore, an exemplary embodiment of present invention may further include a vehicle start process for turning ON a start when the high voltage battery 200 is not submerged S105 as a result of performing the first submersion determination S110. In other words, the controller 220 may be configured to determine as a safe state in a dangerous situation when the high voltage battery 200 is not submerged to normally turn ON the start of the vehicle S105 (e.g., turning on the vehicle without cutting power off due to a submerging of the battery).

Subsequently, the submersion determination S110, S115 may further include a second submersion determination S115 for determining whether the high voltage battery 200 is submerged when the start of the vehicle is turned ON S105. For example, even when the start of the vehicle is turned ON S105 and the vehicle being driven, the controller 220 may be configured to determine whether the high voltage battery 200 is submerged S115. When the controller 220 determines that the high voltage battery 200 is not submerged, the determination of whether the high voltage battery 200 is submerged S115 may be performed again using the sensing system 210.

As a result of performing the second submersion determination S115, when the high voltage battery 200 is submerged, a drive determination S130 for determining whether the vehicle is driving may be performed by the controller after outputting the submersion S125. In other words, when the controller 220 determines that the high voltage battery 200 is submerged, the controller 220 may be configured to output a warning signal to the warning unit 230, and thus enables the user to recognize the submersion situation S125 through the warning unit 230.

Furthermore, as a result of performing the drive determination S130 as described above, when the vehicle is driving, the driving power of the vehicle may be gradually reduced during a preset time S135, and when the driving power of the vehicle is removed, the power cut off S140 may be performed by the controller, and as a result of performing the drive determination S130, when the vehicle stops, the power cut off S140 may be performed. In other words, the drive determination S130 may be performed by the controller to prevent the vehicle and the driver thereof from being shocked and thus facing a dangerous situation when the submersion situation of the high velocity battery 200 occurs during driving and the start of the vehicle may be immediately turned OFF. For example, when the vehicle is being driven, the driving power consumed for driving the vehicle may be gradually reduced based on a preset time, thereby enabling the user to park the vehicle during the preset time to turn off the start of a vehicle S135, S140, and when the vehicle stops, since the vehicle is already in a situation where the vehicle may be stably parked, the start of the vehicle may be immediately turned OFF S140.

Further, according to an exemplary embodiment of the present invention, when the power cut off S140 is performed, the connection between the high voltage battery 200 and the high voltage device 240 may be cut off by the controller using the high voltage relay 250 as described above, through which the electric shock accident by the high voltage devices 240 and the failure of the high voltage device 240 may be prevented.

According to a method and an apparatus of controlling the start of the vehicle configured as described above, whether the high voltage battery is submerged may be determined before the start of the vehicle and when the high voltage battery is submerged, the start of the vehicle may be cut off to improve vehicle safety. Further, whether the high voltage battery is submerged may be determined during driving to allow the user to recognize the submersion for emergency parking of the vehicle, thereby improving the safety of the driver. The present invention may be applied without adding separate devices, and thus has an effect of reducing costs as compared to the related art.

While the invention will be described in conjunction with exemplary embodiments, it will be understood that present description is not intended to limit the invention to those exemplary embodiments. On the contrary, the invention is intended to cover not only the exemplary embodiments, but also various alternatives, modifications, equivalents and other embodiments, which may be included within the spirit and scope of the invention as defined by the appended claims.

What is claimed is:

1. A method for controlling the start of a vehicle, comprising:
   determining, by a controller, whether a high voltage battery of a vehicle is submerged;
   warning and outputting, by the controller, a warning signal when the high voltage battery is submerged;
   cutting off power and turning OFF the vehicle ignition or start of the vehicle after outputting the warning signal, by the controller; and
   determining, by the controller, whether the vehicle is driving after outputting the submersion warning when the high voltage battery is submerged,
   wherein the submersion determination includes a first submersion determination for determining whether the high voltage battery is submerged when the ignition of the vehicle is turned ON, and
   wherein the submersion determination a second submersion determination for determining whether the high voltage battery is submerged when the start of the vehicle is turned ON.

2. The method for controlling the start of a vehicle of claim 1, further comprising:
   turning start ON, by the controller, when the high voltage battery is not submerged as a result of performing the first submersion determination.

3. The method for controlling the start of a vehicle of claim 1, wherein when the vehicle is driving, a driving power of the vehicle is decreased.

4. The method for controlling the start of a vehicle of claim 1, wherein when the vehicle is stopped, the power is cut off by the controller.

5. The method for controlling the start of a vehicle of claim 1, wherein when the power is cut off, the connection between the high voltage battery and the high voltage device is cut off by the controller.

6. A non-transitory computer readable medium containing program instructions executed by a controller, the computer readable medium comprising:
   program instructions that operate a sensor system to determine whether a high voltage battery of a vehicle is submerged;
   program instructions that warn and output a warning signal when the high voltage battery is submerged;
   program instructions that cut off turn OFF the vehicle ignition or start of the vehicle after outputting the warning signal; and program instuctions that determine whether the vehicle is driving after outputting the submersion warning when the high voltage battery is submerged, wherein the submersion determination includes a first submersion determination for determining whether the high voltage battery is submerged when the ignition of the vehicle is turned ON, and wherein the submersion determination a second submersion determination for determining whether the high voltage battery is submerged when the start of the vehicle is turned ON.

7. The non-transitory computer readable medium of claim 6, further comprising:

program instructions that turn start ON when the high voltage battery is not submerged as a result of performing the first submersion determination.

8. The non-transitory computer readable medium of claim 6, wherein when the vehicle is driving, a driving power of the vehicle is gradually decreased for a preset time, and the power is cut off by the controller when the driving power of the vehicle is removed.

9. The non-transitory computer readable medium of claim 6, wherein when the vehicle is stopped, the power is cut off by the controller.

10. The non-transitory computer readable medium of claim 6, wherein when the power is cut off, the connection between the high voltage battery and the high voltage device is cut off by the controller.

* * * * *